US010188973B2

(12) United States Patent
Clayton et al.

(10) Patent No.: US 10,188,973 B2
(45) Date of Patent: Jan. 29, 2019

(54) APPARATUS AND METHOD USING AN ELECTRIC FIELD FOR CREATING UNIFORM NANOFIBER PATTERNS ON NONCONDUCTIVE MATERIALS TO ENHANCE FILTRATION AND FOR EMBEDMENT OF FIBERS INTO MATERIALS FOR OTHER APPLICATIONS

(71) Applicant: Research Triangle Institute, Research Triangle Park, NC (US)

(72) Inventors: Anthony Clint Clayton, Rougemont, NC (US); Howard Jerome Walls, Apex, NC (US); Adam Joseph Rieth, Durham, NC (US); David Samuel Ensor, Chapel Hill, NC (US)

(73) Assignee: Research Triangle Institute, Research Triangle Park, NC (US)

( * ) Notice: Subject to any disclaimer, the term of this patent is extended or adjusted under 35 U.S.C. 154(b) by 120 days.

(21) Appl. No.: 14/646,165

(22) PCT Filed: Dec. 6, 2013

(86) PCT No.: PCT/US2013/073620
§ 371 (c)(1),
(2) Date: May 20, 2015

(87) PCT Pub. No.: WO2014/089458
PCT Pub. Date: Jun. 12, 2014

(65) Prior Publication Data
US 2015/0298036 A1    Oct. 22, 2015

Related U.S. Application Data

(60) Provisional application No. 61/734,105, filed on Dec. 6, 2012.

(51) Int. Cl.
*B01D 39/00*   (2006.01)

(52) U.S. Cl.
CPC ........ *B01D 39/00* (2013.01); *B01D 2239/025* (2013.01); *B01D 2239/069* (2013.01);
(Continued)

(58) Field of Classification Search
CPC .......................... B01D 39/00; B01D 39/1623; B01D 2239/25; B01D 2239/654;
(Continued)

(56) References Cited

U.S. PATENT DOCUMENTS 3,864,198 A * 2/1975 Jackson ................. B29D 28/00
156/211
6,218,910 B1 4/2001 Miller
(Continued)

FOREIGN PATENT DOCUMENTS

EP    1858617 B1    10/2011

OTHER PUBLICATIONS

International Search Report dated Mar. 21, 2014, in PCT/US2013/073620, filed Dec. 6, 2013.

Primary Examiner — Robert Clemente
(74) Attorney, Agent, or Firm — Olive Law Group, PLLC

(57) ABSTRACT

A filtration device including a base filtration material having openings for fluid flow there through and a filtration medium. The filtration medium includes a plurality of patterned nanofibers formed on the base filtration material. The filtration medium has a figure of merit greater than 30 $kPa^{-1}$, where the figure of merit is given by $-Log\ (Pt)/\Delta P$, where Pt is the fractional penetration of a specific aerosol particle diameter and $\Delta P$ is a pressure drop across the filtration medium corresponding to a face velocity of 5.3 cm/s and particle size of 0.3 microns.

20 Claims, 7 Drawing Sheets

View under inspection microscope   Backlit filter

(52) U.S. Cl.
CPC ............... *B01D 2239/0631* (2013.01); *B01D 2239/0654* (2013.01)

(58) Field of Classification Search
CPC ........ B01D 2239/025; B01D 2239/065; B01D 2239/0654; B01D 2239/069; B01D 2239/0631
See application file for complete search history.

(56) References Cited

U.S. PATENT DOCUMENTS

| | | |
|---|---|---|
| 6,501,343 B2 | 12/2002 | Miller |
| 6,630,016 B2 | 10/2003 | Koslow |
| 6,660,172 B2 | 12/2003 | Koslow |
| 6,686,754 B2 | 2/2004 | Miller |
| 6,835,311 B2 | 12/2004 | Koslow |
| 6,866,704 B2 | 3/2005 | Koslow |
| 6,872,311 B2 | 3/2005 | Koslow |
| 6,913,154 B2 | 7/2005 | Koslow |
| 6,917,210 B2 | 7/2005 | Miller |
| 6,953,604 B2 | 10/2005 | Koslow |
| 6,959,820 B2 | 11/2005 | Koslow |
| 6,998,058 B2 | 2/2006 | Koslow |
| 7,008,537 B2 | 3/2006 | Koslow |
| 7,011,753 B2 | 3/2006 | Koslow |
| 7,144,533 B2 | 12/2006 | Koslow |
| 7,241,388 B2 | 7/2007 | Koslow |
| 7,276,166 B2 | 10/2007 | Koslow |
| 7,287,650 B2 | 10/2007 | Koslow |
| 7,296,691 B2 | 11/2007 | Koslow |
| 7,592,277 B2 | 9/2009 | Andrady et al. |
| 7,655,070 B1 | 2/2010 | Dallas et al. |
| 7,655,112 B2 | 2/2010 | Koslow |
| 7,717,975 B2 | 5/2010 | Kalayci et al. |
| 7,789,930 B2 | 9/2010 | Ensor et al. |
| 7,918,913 B2 | 4/2011 | Kalayci et al. |
| 8,048,210 B2 | 11/2011 | Dallas et al. |
| 8,056,733 B2 | 11/2011 | Koslow |
| 8,177,876 B2 | 5/2012 | Kalayci et al. |
| 8,211,218 B2 | 7/2012 | Dallas et al. |
| 8,246,730 B2 | 8/2012 | Dallas |
| 8,613,363 B2 | 12/2013 | Koslow | |
| 2001/0035800 A1 | 11/2001 | Miller | |
| 2003/0067316 A1 | 4/2003 | Miller | |
| 2003/0140785 A1 | 7/2003 | Koslow | |
| 2003/0141261 A1 | 7/2003 | Koslow | |
| 2003/0168401 A1 | 9/2003 | Koslow | |
| 2003/0177909 A1 | 9/2003 | Koslow | |
| 2003/0196963 A1 | 10/2003 | Koslow | |
| 2003/0196964 A1 | 10/2003 | Koslow | |
| 2003/0200868 A1 | 10/2003 | Koslow | |
| 2003/0201231 A1 | 10/2003 | Koslow | |
| 2003/0205529 A1 | 11/2003 | Koslow | |
| 2003/0205530 A1 | 11/2003 | Koslow | |
| 2003/0205531 A1 | 11/2003 | Koslow | |
| 2003/0213750 A1 | 11/2003 | Koslow | |
| 2004/0031749 A1 | 2/2004 | Koslow | |
| 2004/0084378 A1 | 5/2004 | Koslow | |
| 2004/0140822 A1 | 7/2004 | Miller | |
| 2004/0178142 A1 | 9/2004 | Koslow | |
| 2005/0011827 A1 | 1/2005 | Koslow | |
| 2005/0051487 A1 | 3/2005 | Koslow | |
| 2006/0159916 A1* | 7/2006 | Dubrow | B01J 20/28007 428/357 |
| 2006/0230731 A1 | 10/2006 | Kalayci et al. | |
| 2006/0264140 A1 | 11/2006 | Andrady et al. | |
| 2007/0298064 A1 | 12/2007 | Koslow | |
| 2008/0110342 A1* | 5/2008 | Ensor | B01D 39/1623 96/54 |
| 2009/0221047 A1 | 9/2009 | Schindler et al. | |
| 2010/0031617 A1 | 2/2010 | Ensor et al. | |
| 2010/0044289 A1 | 2/2010 | Koslow | |
| 2010/0176068 A1 | 7/2010 | Dallas et al. | |
| 2011/0005180 A1 | 1/2011 | Kalayci et al. | |
| 2011/0115512 A1 | 5/2011 | Miller | |
| 2011/0139706 A1 | 6/2011 | Kalayci et al. | |
| 2011/0174158 A1* | 7/2011 | Walls | B01D 39/1623 96/60 |
| 2011/0253620 A1 | 10/2011 | Dallas et al. | |
| 2011/0293485 A1 | 12/2011 | Dallas et al. | |
| 2012/0040581 A1* | 2/2012 | Kim | C04B 35/62218 442/330 |
| 2012/0272828 A1 | 11/2012 | Dallas et al. | |

* cited by examiner

Diamond
 Nested patterns
 Fine grid
 Fish scale

Step 1. Electrospinning
Exploded view Not to scale

Step 2. Nanofiber media removed from patterning system

Mesh is only part of deposition process not present in final product

Movement of sheet or roll

APPARATUS AND METHOD USING AN ELECTRIC FIELD FOR CREATING UNIFORM NANOFIBER PATTERNS ON NONCONDUCTIVE MATERIALS TO ENHANCE FILTRATION AND FOR EMBEDMENT OF FIBERS INTO MATERIALS FOR OTHER APPLICATIONS

CROSS REFERENCE TO RELATED APPLICATIONS

This application is related to and claims the benefit of priority from U.S. provisional application No. 61/734,105, filed Dec. 6, 2012, the entire content of which is incorporated herein by reference. This application is related to U.S. Ser. No. 11/559,282, (hereinafter the '282 application) filed Nov. 13, 2006, the entire contents of which is incorporated herein by reference. This application is related to U.S. application Ser. No. 10/819,916, filed on Apr. 8, 2004, entitled "Electrospinning of Polymer Nanofibers Using a Rotating Spray Head," the entire contents of which are incorporated herein by reference. U.S. application Ser. No. 11/559,282, filed Nov. 13, 2006, is also related to U.S. application Ser. No. 10/819,942, filed on Apr. 8, 2004, entitled "Electrospray/electrospinning Apparatus and Method," the entire contents of which are incorporated herein by reference. U.S. application Ser. No. 11/559,282, filed Nov. 13, 2006, is related to U.S. application Ser. No. 10/819,945, filed Apr. 8, 2004, entitled "Electrospinning in a Controlled Gaseous Environment," the entire contents of which are incorporated herein by reference. U.S. application Ser. No. 11/559,282, filed Nov. 13, 2006, is related to U.S. Ser. No. 11/130,269, filed May 17, 2005 entitled "Nanofiber Mats and Production Methods Thereof," the entire contents of which are incorporated herein by reference.

BACKGROUND OF THE INVENTION

Field of the Invention

The present invention is related to nanofibers, methods and devices for electrospinning, methods and devices for depositing the nanofibers, and filters and other articles formed from the deposited nanofibers.

Description of the Related Art

The filtration industry has traditionally manufactured particulate air filters using conventional medium such as glass, cotton or polymer fibers made provided as rolled goods. The fibrous media may be made by non-woven processes such as wet laid paper, melt blown-spinning or woven yarn. The material is then transported to equipment where the media is cut, pleated, supported, glued into filter frames, and tested for leaks. Various measures of the properties of the rolled goods include appropriate weight per unit area, porosity, etc.

The porous filter media may be pleated or bonded into bags to increase the area of the media within individual filter units to reduce pressure drop. Often screens and other supports are added to prevent collapse of the media from the force of air flowing through the filter unit as dust is collected. Depending on the intended use of the filter, the filter may be tested with an appropriate challenge aerosol at a rated or standard airflow rate for pressure drop and particle collection efficiency. (e. g., ASHRAE 52.2, MIL-STD-282, IEST RP-CC 007.1, NIOSH APRS-STP-0051-00, and NIOSH APRS-0057-00 may be used to test the filters)

Theoretically, a reduction of the diameter of the fibers in a filter has the potential of causing an improvement of the filter system performance. For high efficiency filtration, fiberglass wet-laid papers are widely used having fiber diameters in the 200 nm to 5000 nm size range with the fiber sizes intentionally blended for both durability and filtration performance.

One technique for producing a smaller fiber diameter, and hence a potential for generating improved filtration media, is electrospinning of polymers to make submicron and nanofibers. Electrospinning as currently practiced uses a constant voltage to drive the spinning process defined herein as static field electrospinning.

However, electrospun nanofibers smaller than 500 nm are typically fragile, difficult to produce, and difficult to handle. One conventional approach has been to deposit nanofibers onto a conventional porous filter media to make a layered nanofiber filter media. The following patents describe conventional ways to fabricate nanofiber containing filters for various applications: U.S. Pat. Nos. 7,008,465; 6,994,742; 6,974,490; 6,955,775; 6,924,028; 6,875,256; 6,875,249; 6,800,117; 6,746,517; 6,743,273; 6,740,142; 6,716,274; and 6,673,136, and U.S. patent application Ser. Nos. 10/757,924 and 10/676,185; the entire contents of each of these patents are incorporated in entirety herein by reference.

An ideal particulate filter is the one that would give the highest particle collection efficiency (lowest particle penetration) with the least pressure drop. One criterion for comparing filters of different thickness is the filter quality factor or figure of merit (FoM). The greater the value of FoM, the better the filter will perform (Hinds, 1982). One expression for this parameter is given by:

$$\mathrm{FoM} = -\mathrm{Log}(Pt)/\Delta P \quad (1)$$

where: Pt is the fractional penetration of a specific aerosol particle diameter (efficiency=(1−Pt)), and ΔP is the pressure drop corresponding to a specific face velocity of the filter (volumetric air flow divided by filter cross sectional area). As used herein, figure of merit given by −Log (Pt)/ΔP, where Pt is the fractional penetration of a specific aerosol particle diameter and ΔP is a pressure drop across the filtration medium corresponding to a face velocity of 5.3 cm/s and particle size of 0.3 microns.

Typically, the FoM of a high efficiency particulate air (HEPA) glass fiber media is 12 kPa$^{-1}$ measured at a face velocity of 5.33 cm/s and 0.3 μm particle diameter. These are the standard conditions for HEPA media tests (i.e., IEST-RP-CC021.1).

The FoM of the layered nanofiber conventional porous filter media described above is limited by the relatively large fiber diameters of the coarse substrate which produce a relatively low FoM. The FoM of the layered nanofiber conventional porous filter media composite depends on the relative quantities of layers of nanofibers and conventional media and their respective FoM. In other words, while the individual layers of nanofibers may have a higher FoM than the conventional porous filter media substrate, the composite FoM is closer to the value of the convention porous filter media substrate because of the relative quantities of materials used in the conventional approach. Therefore at the current state-of-the-art, conventional layered nanofiber filter media do not provide filters with significantly greater FoM than conventional fiberglass media.

References describing various background materials and filter testing procedures include:

1. ASHRAE (1999) Method of Testing General Ventilation Air-Cleaning Devices for Removal Efficiency by Particle Size, Standard 52.2-1999. American Society of Heating, Refrigerating and Air-Conditioning Engineers, Inc. 1791 Tullie Circle, N. E. Atlanta, USA.

2. Ahn, Y. C., S. K. Park, et al. (2005). "Development of high efficiency nanofilters made of nanofibers." Current Applied Physics: In press (accessed online).
3. Dhaniyala, S. and B. Y. H. Liu (1999a). "Investigations of particle penetration in fibrous filters part I. Experimental." Journal of the IEST 42(1): 32-40.
4. Dhaniyala, S. and B. Y. H. Liu (1999b). "Investigations of particle penetration in fibrous filters Part II. Theoretical." Journal of the IEST 42(2): 40-46.
5. Hinds, W. C. (1982). Aerosol Technology. New York, John Wiley & Sons, Inc.
6. IEST (1992) Institute of Environmental Sciences, Testing ULPA Filters. IEST RP-CC 007.1 Institute of Environmental Science and Technology, Rolling Meadows, USA.
7. IEST (1995) Institute of Environmental Sciences and Technology (1995) Testing HEPA and ULPA Filter Media, IEST-RP-CC021.1, Rolling Meadows, Ill.
8. MIL-STD-282, Filter units, Protective Clothing, Gasmask Components and Related Products: Performance Test Methods, US Government Printing Office, May 28, 1956.
9. National Institute for Occupational Safety and Health (NIOSH) Particulate Filter Penetration Procedure to Test Negative Pressure Respirators against Liquid Particulates (Procedure APRS-STP-0051-00) Morgantown, W. Va.: NIOSH Division of Safety Research, 1955.
10. National Institute for Occupational Safety and Health (NIOSH) Particulate Filter Penetration Procedure to Test Negative Pressure Respirators against Solid Particulates (Procedure APRS-STP-0057-00) Morgantown, W. Va.: NIOSH Division of Safety Research, 1955.
11. Park, H. S. and Y. O. Park (2005). "Filtration properties of electrospun utrafine fiber webs." Korean Journal of Chemical Engineering 22(1): 165-172.
12. Schreuder-Gibson, H. L., P. Gibson, et al. (2004). "Cooperative charging effects of fibers from electrospinning of electrically dissimilar polymers." International Nonwovens Journal 13(4): 39-45.
13. Thomas, D., P. Contal, V. Renaudin, P. Penicot, D. Leclerc and J. Vendel (1999) Modelling pressure drop in HEPA filters during dynamic filtration. J. Aerosol Science, 30(2) 235-246.
14. S. Payet, D. Boulaud, G. Madelaine and A. Renoux (1992) Penetration and pressure drop of a HEPA filter during loading with submicron liquid particles. J. Aerosol Science 23(7). 723-735.
15. Bhattarai, S. R., N. Bhattarai, et al. (2004). "Novel biodegradable electrospun membrane: scaffold for tissue engineering." Biomaterials 25(13): 2595-2602.
16. Boudriot, U., B. Goetz, et al. (2005). "Role of electrospun nanofibers in stem cell technologies and tissue engineering." Macromolecular Symposia 225: 9-16.
17. Choi, S. S., Y. S. Lee, et al. (2004). "Electrospun PVDF nanofiber web as polymer electrolyte or separator." Electrochimica Acta 50(2-3): 339-343.
18. Choi, S. W., S. M. Jo, et al. (2003). "An electrospun poly(vinylidene fluoride) nanofibrous membrane and its battery applications." Advanced Materials 15(23): 2027-2032.
19. Jia, H. F., G. Y. Zhu, et al. (2002). "Enzyme-carrying polymeric nanofibers prepared via electrospinning for use as unique biocatalysts." Biotechnology Progress 18(5): 1027-1032.
20. Liu, H. Q., J. B. Edel, et al. (2006). "Electrospun polymer nanofibers as subwavelength optical waveguides incorporating quantum dots." Small 2(4): 495-499.
21. Zhang, Y. Z., C. T. Lim, et al. (2005). "Recent development of polymer nanofibers for biomedical and biotechnological applications." Journal of Materials Science-Materials in Medicine 16(10): 933-946.
22. Aussawasathien, D., J. H. Dong, et al. (2005). "Electrospun polymer nanofiber sensors." Synthetic Metals 154(1-3): 37-40.
23. Chronakis, I. S. (2005). "Novel nanocomposites and nanoceramics based on polymer nanofibers using electrospinning process—A review." Journal of Materials Processing Technology 167(2-3): 283-293.
24. Demir, M. M., M. A. Gulgun, et al. (2004). "Palladium nanoparticles by electrospinning from poly(acrylonitrile-co-acrylic acid)-PdCl2 solutions. Relations between preparation conditions, particle size, and catalytic activity." Macromolecules 37(5): 1787-1792.
25. Ding, B., M. Yamazaki, et al. (2005). "Electrospun fibrous polyacrylic acid membrane-based gas sensors." Sensors and Actuators B-Chemical 106(1): 477-483.
26. Huang, Z. M., Y. Z. Zhang, et al. (2003). "A review on polymer nanofibers by electrospinning and their applications in nanocomposites." Composites Science and Technology 63(15): 2223-2253.
27. Jia, H. F., G. Y. Zhu, et al. (2002). "Enzyme-carrying polymeric nanofibers prepared via electrospinning for use as unique biocatalysts." Biotechnology Progress 18(5): 1027-1032.
28. Katti, D. S., K. W. Robinson, et al. (2004). "Bioresorbable nanofiber-based systems for wound healing and drug delivery: Optimization of fabrication parameters." Journal of Biomedical Materials Research Part B-Applied Biomaterials 70B(2): 286-296.
29. Kenawy, E. R. and Y. R. Abdel-Fattah (2002). "Antimicrobial properties of modified and electrospun poly (vinyl phenol)." Macromolecular Bioscience 2(6): 261-266.
30. Khil, M. S., D. I. Cha, et al. (2003). "Electrospun nanofibrous polyurethane membrane as wound dressing." Journal of Biomedical Materials Research Part B-Applied Biomaterials 67B(2): 675-679.
31. Liu, H. Q., J. Kameoka, et al. (2004). "Polymeric nanowire chemical sensor." Nano Letters 4(4): 671-675.
32. Luong-Van, E., L. Grondahl, et al. (2006). "Controlled release of heparin from poly(epsilon-caprolactone) electrospun fibers." Biomaterials 27(9): 2042-2050.
33. Ma, Z. W., M. Kotaki, et al. (2005). "Potential of nanofiber matrix as tissue-engineering scaffolds." @Tissue Engineering 11(1-2): 101-109.
34. Murugan, R. and S. Ramakrishna (2006). "Nanofeatured scaffolds for tissue engineering: A review of spinning methodologies." Tissue Engineering 12(3): 435-447.
35. Spasova, M., N. Manolova, et al. (2004). "Preparation of chitosan-containing nanofibres by electrospinning of chitosan/poly(ethylene oxide) blend solutions." E-Polymers.
36. Zeng, J., X. Y. Xu, et al. (2003). "Biodegradable electrospun fibers for drug delivery." Journal of Controlled Release 92(3): 227-231.

The entire contents of these references are incorporate herein by reference.

More recently, as described in U.S. application Ser. No. 11/559,282, noted above, a filtration device was provided which included a filtration medium having a plurality of nanofibers of diameters less than 1 micron which were formed into a fiber mat in the presence of an abruptly varying electric field. The filtration device in the '282 application included a support attached to the filtration medium which had openings for fluid flow there through.

SUMMARY OF THE INVENTION

In one embodiment of the present invention, there is provided a filtration device including a base filtration material having openings for fluid flow there through and a filtration medium comprising a plurality of patterned nanofibers formed on the base filtration material. The filtration medium has a figure of merit greater than 30 $kPa^{-1}$, where the figure of merit is given by $-Log (Pt)/\Delta P$, where Pt is the fractional penetration of a specific aerosol particle diameter and $\Delta P$ is a pressure drop across the filtration medium corresponding to a face velocity of 5.3 cm/s and particle size of 0.3 microns.

In one embodiment of the present invention, there is provided an apparatus for depositing the patterned filtration medium, as detailed below.

It is to be understood that both the foregoing general description of the invention and the following detailed description are exemplary, but are not restrictive of the invention.

BRIEF DESCRIPTION OF THE FIGURES

Various other objects, features and attendant advantages of the present invention will be more fully appreciated as the same becomes better understood from the following detailed description when considered in connection with the accompanying drawings in which like reference characters designate like or corresponding parts throughout the several views and wherein.

NUMBER KEY

Figure 1:
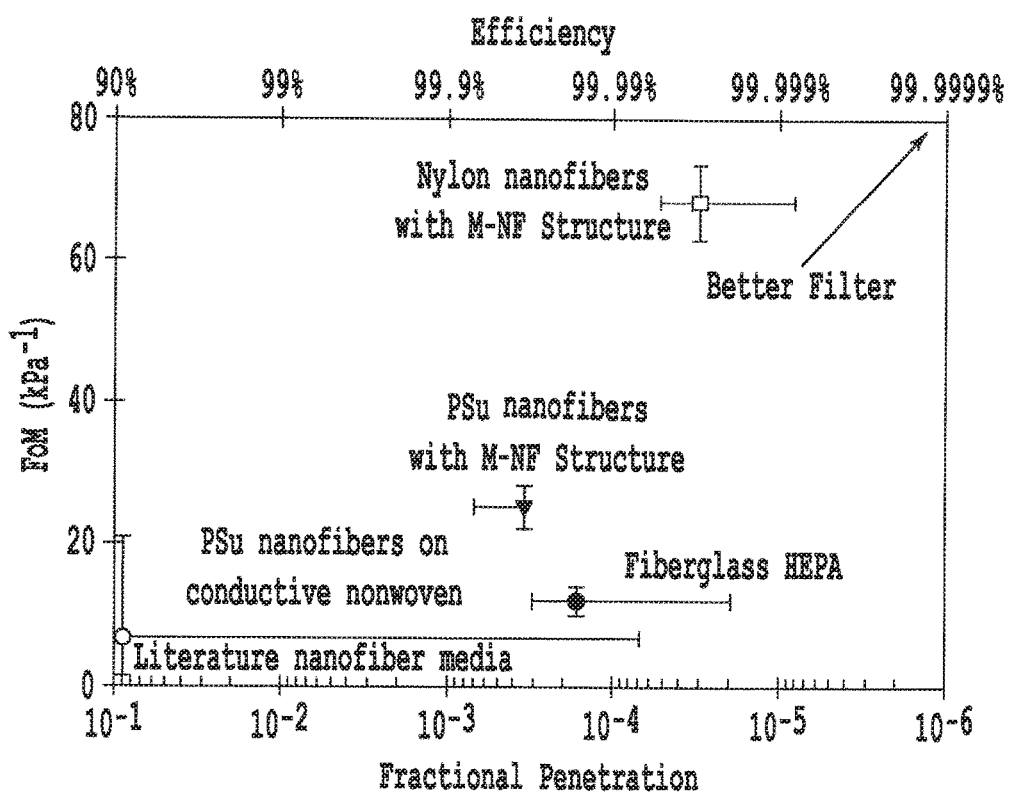
FIG. 1 is a graph comparing filtration performance for various filter medias including the nano-fiber filters of the present invention.

1. Syringe pump/polymer solution delivery system
2. Carbon dioxide or other electronegative gas with temperature and RH control
3. Spinneret
4. Enclosure for safety and environmental control
5. Optional auxiliary electrodes with negative potential
6. Metal or conductive pattern
7. Substrate (woven, nonwoven, or similar) to deposit fibers onto
8. Vacuum or vent line
9. Insulated drive belt to provide rotation or substrate movement
10. Electric motor to drive rotation or positioning
11. Connections for negative voltage, process gas monitoring and venting
12. Negative high voltage supply
13. Positive high voltage supply
20. Composite formed of nanofibers patterned onto substrate
101. Base or structural support, typically composed of insulating materials
102. Substrate or backing material composed of woven, nonwoven, etc
103. Non conductive fiber material
104. Additional layer of material

DETAILED DESCRIPTION OF THE INVENTION

The present invention provides a way to form patterned nanofibers structures with exceptionally high figures of merit (FOM).

The present invention provides for fabrication of nanofiber mats that could be used, for example, but not limited to filtration applications. The present invention can be applied to a wide range of other areas such as single filaments, yarns, nonwoven materials and membranes. Marked improvements in filter performance, as indicated by FoM, are provided for in various embodiments of the present invention.

More specifically, this invention provides an apparatus and method for electrospinning nanofibers onto woven and nonwoven materials, where enhanced filtration efficiency per air flow resistance is realized. Potential applications for this technology include: air and liquid filtration, protective equipment, industrial hygiene, health care, food safety, technical textiles, fabrics, multifunctional materials, and defense.

Traditionally nanofibers for use in air filtration provide only modest improvements in collection efficiency per filter pressure drop (i.e., air flow resistance) compared to conventional materials. The '282 application achieved improved results by depositing sub-100 nm fibers onto a metal mesh developing nanofiber filter materials that have 2 to 6 times improvement (depends on the polymer used) in filtration efficiency per pressure drop compared to conventional filter materials. The nanofibers were deposited onto the conductive metal mesh forms an integrated metal-mesh fiber structure.

The present invention does not require an integrated metal-mesh fiber structure and yet still achieves significant improvement in collection efficiency per pressure drop using flexible substrates (e.g., nonwovens). This advancement broadens the potential use of nanofibers on textiles and should lower the cost and technical difficulty of scaling up an advanced filtration media compared to the M-NF Filter Structure. Furthermore, this technology has industrial applications in the field of technical textiles where fibers, microfibers, and nanofibers are incorporated on/into woven and nonwoven textiles.

In simple terms, this invention produces patterned nanofibers onto substrates. As used herein, patterned nanofibers are fibers formed in compliance with a predefined pattern and thereby having an organization and orientation of the fibers on the substrate surface set by the predefined pattern.

The patterning as described below can include simple patterns as well as nested or complex patterns following the pattern of the underlying substrate, e.g. a patterned grid or metal mesh. As detailed below, this patterning can include parallel lines with large spacing and a small grid pattern, large and small grid patterns nested, etc. This patterning can be seen as thick and thin areas of nanofibers at the macroscopic scale while resulting in three-dimension orientation of the fibers in/on the substrate at the microscopic scale.

Defining Performance:

Filtration performance is measured by the filtration efficiency (particle retention) and air flow resistance. In high efficiency media, it is often more convenient to use particle penetration (fraction penetration Pt=1–fractional efficiency). Air flow resistance is indicated by the pressure drop ($\Delta P$) across the filter at a particular flow rate and filter media surface area. A standard convention is to measure the fractional penetration of 0.3 µm particles at a velocity (flow rate/filter surface area) of 5.3 cm/s. A convenient means of comparing filter performance is the filter figure of merit FoM=–log (Pt)/$\Delta P$, where $\Delta P$ is expressed in kPa. Conventional fibrous filter media have FoMs of approximately 12 $kPa^{-1}$ for 0.3 µm particles at 5.3 cm/s.

A comparison of different nanofiber filter technologies is shown in a plot of FoM versus Pt in FIG. 1. Specifically, FIG. 1 is a graph comparing filtration performance for various filter medias including the nano-fiber filters of the present invention. Performance measured with 0.3 µm particles at 5.33 cm/s. Data points represent average values of collected data sets. The literature data are from a range of materials and fabrication processes with the error bars representing the full range of values observed in the published literature. Error bars on all other materials are for a standard deviation of a data set. This plot in FIG. 1 is in essence the effectiveness of filtration obtained for the level of filtration protection (efficiency of filtration) provided. A filter media with high efficiency and high FoM is able to provide a high level of protection with minimal burden (e.g., filter is easier to breathe through and/or it can be a smaller size). Data for the integrated metal-mesh fiber structure are compared with conventional nanofiber and fiberglass filter media.

Data from "nylon-based nanofiber media" and "polysulfone (PSu)-based nanofiber media" are given as the average and standard deviation for a large number of samples made by the inventors (more than 20). "Fiberglass" data are average and standard deviation for a variety of commercial samples tested by the inventors. "PSu nanofibers on conductive nonwoven" are samples made by the inventors by deposition onto a nonwoven substrate coated with conductive graphite paint (Aerodag). These materials offer no statistically significant improvement over conventional fiberglass filter media. The "literature nanofiber media" are a wide variety of materials reported in the literature with the error bars representing the full range of values observed rather than a standard deviation of samples made via a single fabrication process. For the plot of FIG. 1, the further to the top-right of the plot, the better is the filtration performance of the material.

Fabrication of Electrospun Nanofiber Materials:

Conventional nanofiber electrospinning methods rely on a high positive voltage (+20 kV to +40 kV or higher) applied to a needle (i.e., spinneret) or other device that holds or manages the liquid solution to be spun into nanofibers. The target area (or substrate) for the spun nanofibers has to be at a ground potential (or significantly lower potential than the spinneret) in order to attract the highly positively charged fibers. These charged fibers land onto the grounded surface and form a layer of fibers (also called a mat). Typically, the fibers collect in random orientations forming a nonwoven fibrous mat on top of the substrate. With current methods the substrate is usually made of conductive materials (e.g., metal mesh), or materials with a conductive coating such as carbon paint. Alternately, a thin, minimally-insulating substrate, such as a light-weight nonwoven backing, is placed on top of a grounded target and then the fibers are deposited onto the substrate.

In order to achieve air filtration media, the inventors found that insulating and conductive nonwovens used as deposition substrates lead to little or no improvement over conventional fiberglass filter media (see FIG. 1). Furthermore, a metal mesh (i.e., the integrated metal-mesh fiber structure) was required to achieve significant improvement in filtration performance.

In the present invention, a patterned grid mechanism is placed directly underneath the substrate. With the invention, a non-conductive material can now be used including woven or nonwoven materials and possibly even membranes and other materials that are modest electrical insulators. A negative bias voltage is applied directly to the patterned grid that is underneath the substrate. In some embodiments voltages can range from a few hundred to up to ten thousand volts, or more depending upon the materials and needed processing conditions. The positively charged nanofibers are highly attracted to the negative bias on the grid and began to deposit onto the surface in a rapidly growing pattern. The result is that, during the spinning of the nanofibers, the fibers take the same pattern of the grid or patterned design underneath them. It has also been noted that when viewing the fibers through a microscope it appears that the fibers are at least partly embedded into the substrate, not only on the surface. These fibers now take on filtration properties of filters that used the integrated metal-mesh fiber structure.

Figure 2:
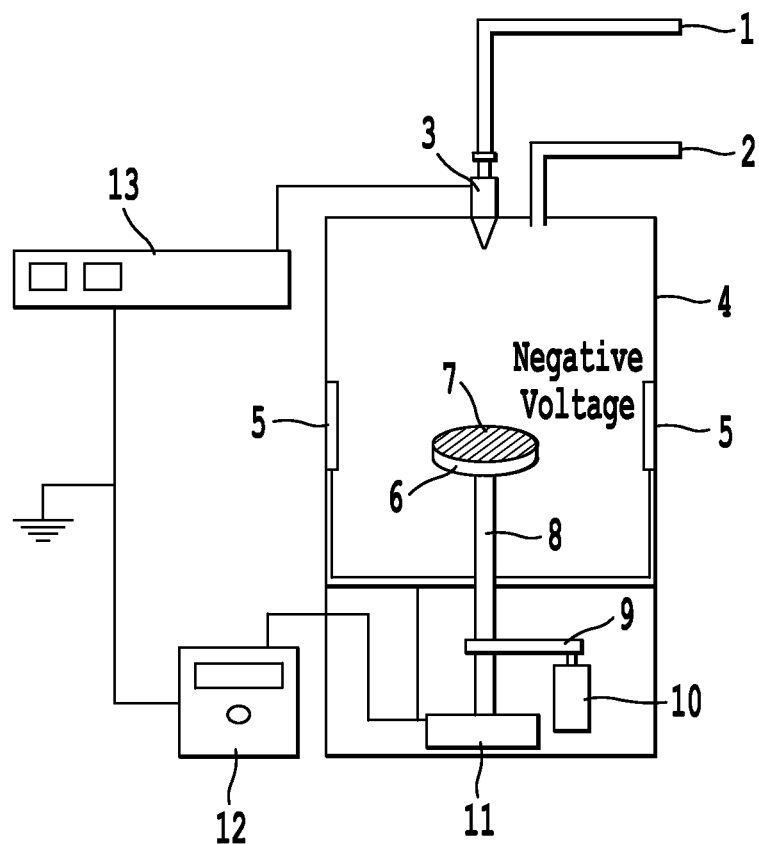
FIG. 2 is a depiction of one configuration for the patterned deposition of electrospun nanofibers onto substrates such as insulating nonwovens.

One configuration for patterned deposition of electrospun nanofibers onto a flexible, light-weight nonwoven substrate is shown in FIG. 2. FIG. 2 is a depiction of this configuration for the patterned deposition of electrospun nanofibers onto substrates such as for example insulating nonwovens. As illustrated there, a polymer solution containing PSu polymer in a solvent (using standard formulations) is fed to a 30G needle. $CO_2$ gas mixed with water vapor and heated to 30 C flows over the syringe and syringe needle. Additional relative humidity (RH) controlled $CO_2$ gas is injected into the electrospinning chamber. A positive power supply is connected to the spinneret and shares a common earth ground with a negative power supply connected to the patterned grid used to drive the patterned deposition of the nanofibers. The nonwoven substrate is mounted on a frame above the patterned grid.

Further, the grid can be in contact with or with a small air gap between the substrate and the grid. Auxiliary electrodes can be used that are connected to the negative power supply to aid in broadening the overall electric field to provide for even dispersion of fibers over the substrate. The substrate can be rotated relative to the spinneret to improve fiber dispersion. The RH- and temperature-controlled $CO_2$ gas flows through the substrate and out the chamber venting system. This flow of gas may help dry the fibers and more generally controls the drying rate.

A variety of mechanisms are suitable in the present invention to control the chamber RH such as placing materials that absorb (e.g. calcium sulfate) or emit water moisture (e.g., hydrogels), operating a small humidifier in the chamber, and adding moisture into the process gas streams prior to introduction to the electrospinning chamber. For example, positive results were obtained by bubbling $CO_2$ through deionized (DI) water and then introducing the humidified $CO_2$ gas into the chamber. In one embodiment of the present invention, two gas streams (e.g., one humidified and one dry) are used to obtain a desired RH for the chamber and/or for the gas jacket flowing over the electrospinning orifice.

With the present patterned nanofiber process, the pressure drop of the forming/growing nanofiber mat can be readily measured and can be used to determine the quality of the forming filter and point at which to stop electrospinning. However, this flow of gas though the forming filter media may not be required in certain embodiments of the present invention. Furthermore, although the process described above was used to demonstrate the present invention, this process was only illustrative, and many other configurations are possible that would permit patterned deposition of fibers onto a substrate.

Results:

Using this patterned deposition method, filters were electrospun with high FoMs and high efficiencies (low Pt). Samples with the following performance metrics were made: 1) a FoM of 45.7 $kPa^{-1}$ and a Pt of $2.34 \times 10^{-4}$, 2) a FoM of 44.1 $kPa^{-1}$ and a Pt of $6.99 \times 10^{-4}$. Performance was measured with 0.3 μm particles at 5.33 cm/s.

Figure 3:
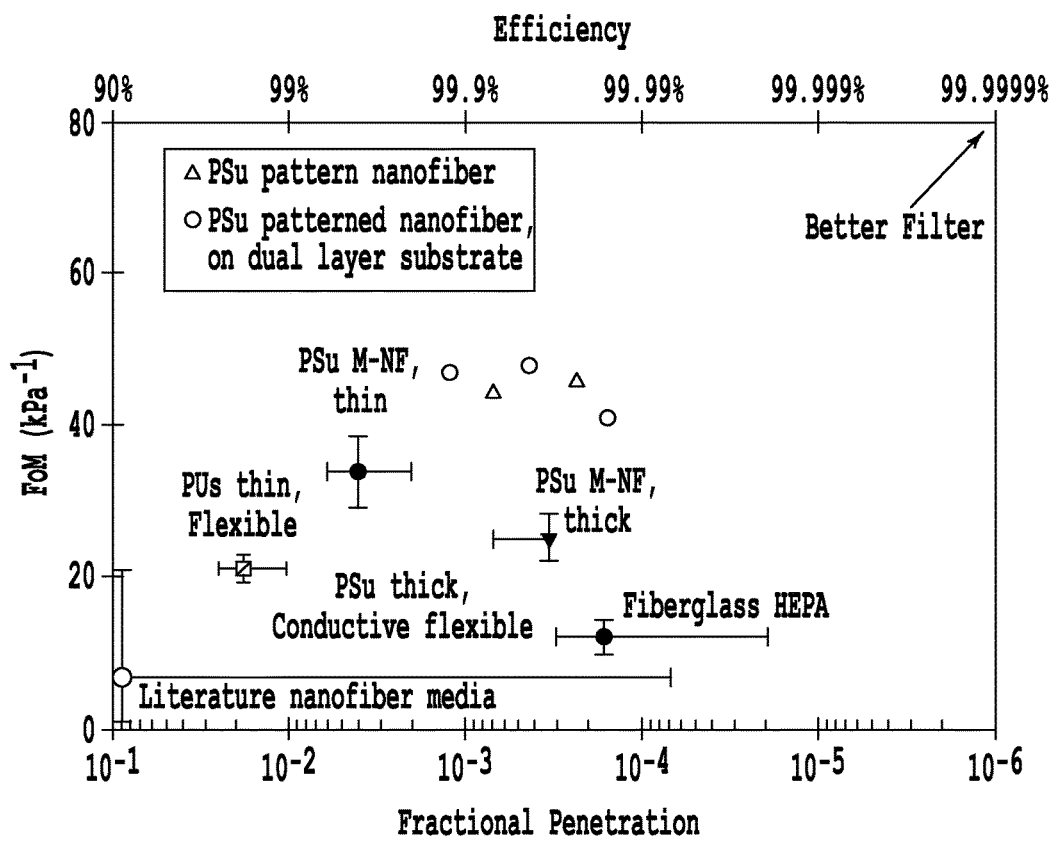
FIG. 3 is a graph comparing patterned nanofiber media of the present invention to nanofiber media without patterning and to nanofiber media on a metal mesh.

Using the concept that the fibers were being pulled into the substrate material during spinning, another set of filters was spun using two very fine nonwoven materials (Fiber Web 2004) glued together before spinning, then spinning to similar pressure drops as with the single layer. The results are as follows:

1) FoM=47.7 $kPa^{-1}$, FP=$4.3 \times 10^{-4}$
2) FoM=40.8 $kPa^{-1}$, FP=$1.55 \times 10^{-4}$
3) FoM=46.8 $kPa^{-1}$, FP=$1.33 \times 10^{-3}$ FIG. 3 compares the results of the patterned deposition of nanofibers onto insulating nonwovens with other fibrous media. Specifically, FIG. 3 is a graph comparing patterned nanofiber media of the present invention to nanofiber media without patterning and to nanofiber media on a metal mesh. In FIG. 3, the patterned nanofiber media are compared to an integrated metal-mesh fiber structure (M-NF Filter structure) and to nanofibers deposited onto flexible nonwoven substrates without patterning.

Figure 4:
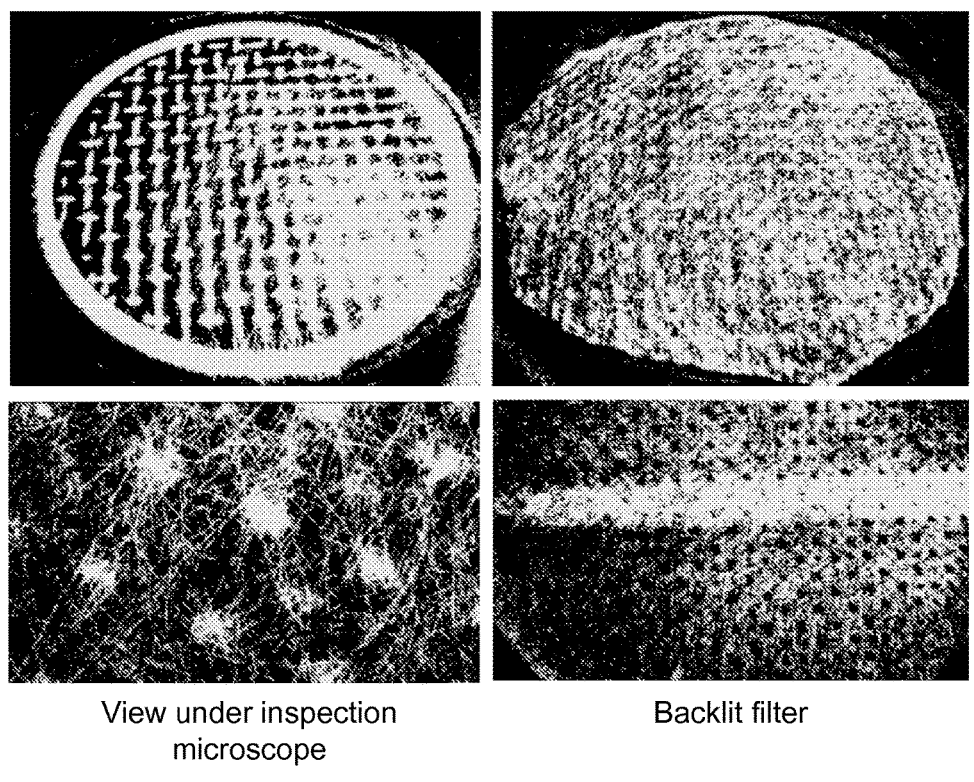
FIG. 4 is a collection of images of patterned nanofiber filter media.

Other filters were spun and tested with FoMs in the 40's. Example images of patterning of the nanofibers onto the substrate are shown in FIG. 4. FIG. 4 is a collection of images of patterned nanofiber filter media. Thus, FIG. 4 shows images of patterned nanofiber filter media, specifically PSu nanofibers deposited on lightweight nonwoven using a metal mesh at a negative potential behind the nonwoven during electrospinning.

Accordingly, the present invention provides the realization of a collection of patterned nanofibers. This collection can be used in a filtration device or in the other applications as discussed below. This collection (as described below) can be included on or removed from a base material having openings for fluid flow there through.

The present invention permits filtration figures of merit to be realized from values of 30 $kPa^{-1}$ to 60 $kPa^{-1}$. Higher values are not precluded. In various embodiments, the figures of merit can range from 40 $kPa^{-1}$ to 60 $kPa^{-1}$. In various embodiments, the figures of merit can range from 50 $kPa^{-1}$ to 60 $kPa^{-1}$.

Other Embodiments

Figure 5:
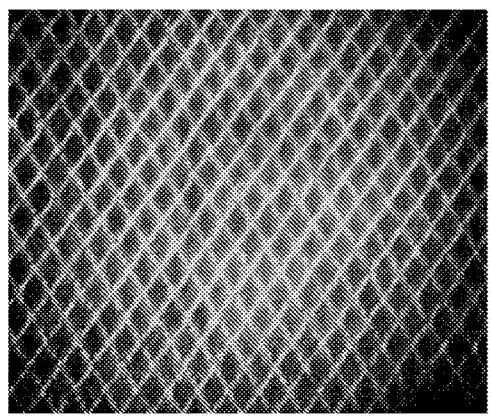
FIG. 5 is a collection of images of various patterns that are possible including nested or complex patterns.
Figure 5:
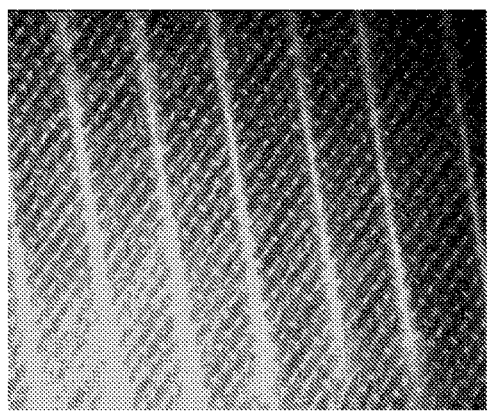
Figure 5:
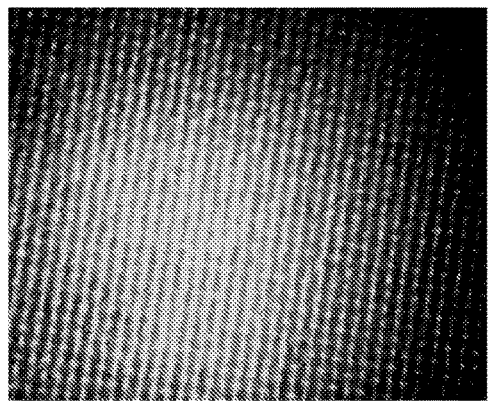
Figure 5:
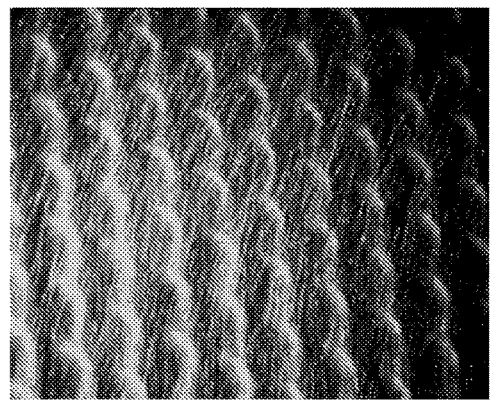

Additional configurations were tested included nested patterns such as parallel lines with large spacing and a small grid pattern, large and small grid patterns nested, etc. In these tests, one patterned grid was used for a short time, and then a second grid pattern was used. The grid can also be rotated partway through electrospinning. FIG. 5 gives examples of some patterns including a nested pattern with broadly spaced parallel lines and a fine grid inside of the lines. More specifically, FIG. 5 is a collection of images of various patterns that are possible including nested or complex patterns. This is done by using two different grids and changing which grid is used for patterning partway through the fiber deposition process.

Another configuration of the present invention would utilize a grid placed upon a flat plate and a nonwoven placed on top of the grid, thus not using the flow-through gas configuration of FIG. 2. A variety of fabrics, nonwovens, and layers of materials were also tested as substrates in this configuration. While not a preferable as the configuration of FIG. 2, this arrangement is still suitable. One issue in this configuration was the observance that the fibers passing completely through the substrate often attached to the underlying patterning grid. These fibers would then break off when the substrate was removed from the patterning grid introducing defects into the filter media. To alleviate this effect, nonstick coatings could be applied, the gap between the grid and substrate could be increased, the thickness and porosity of the substrate could be changed, and the negative potential applied to the underlying grid could be reduced. These process modifications are also applicable to the configuration of FIG. 2.

Figure 6:
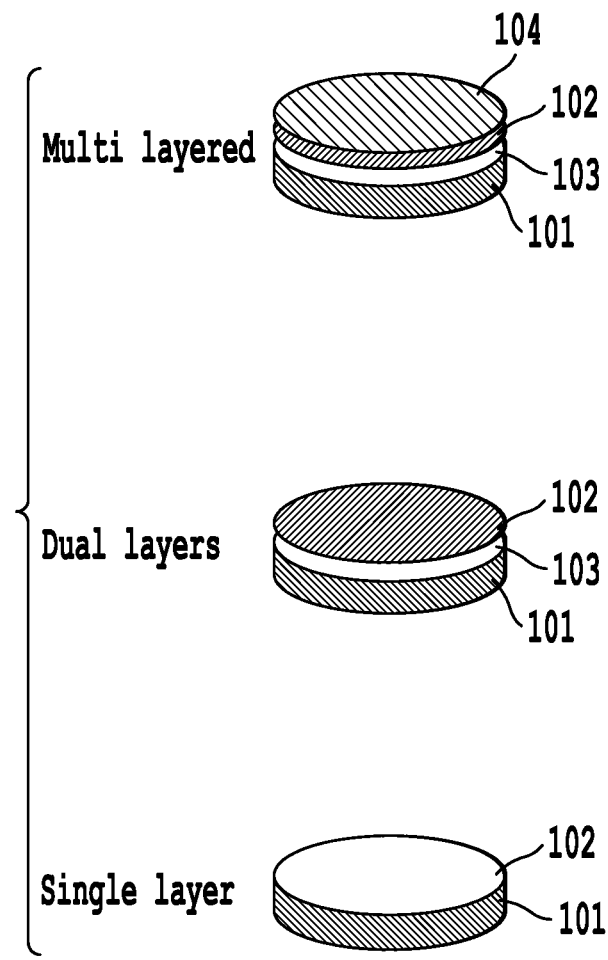
FIG. 6 is a depiction of various layered structures according to the present invention.

FIG. 6 is a depiction of various layered structures according to the present invention. With the present invention a wide variety of possibilities exist including various layered structures. Some examples are illustrated in FIG. 6 which shows examples of various layered structures possible with the present invention.

Using this process of a conductive patterned grid (or surface) behind the substrate with deposition of charged fibers onto a substrate, a variety of fiber deposition configurations are possible. The first demonstration of the invention was done using a small piece of nonwoven above a metal screen (grid) with a negative potential applied to the grid as described above. In one embodiment, a sheet of a substrate material is passed synchronously over a patterning device with continuous deposition of fibers onto the top of the substrate from one or more spinnerets. Alternately, this process could deposit patterned nanofibers on large sheets as opposed to the small circular pieces demonstrated above. In any of these configurations, $CO_2$ or other gas through or over the substrate during electrospinning could be used or omitted.

As noted earlier, the integrated metal-mesh fiber structure was used to obtain significant improvements in FoM for high efficiency media. With the present invention, the metal mesh is used to create the pattern in conjunction with the use of a negative electric potential applied to the mesh. Accordingly, the nanofibers can be deposited onto a flexible substrate (for example a thin nonwoven that is not inherently conductive).

During the fiber deposition process the substrate is placed on, or directly above with a slight air gap, the metal mesh (or other conductive patterned material). The fibers deposit onto the substrate replicating some version of the pattern of the mesh (or other device) behind the substrate.

The electrospinning conditions (choice of polymer, electric field conditions, controlled environment conditions with for example CO gas flow) can be the same or similar to those described in the '282 application for formation of the integrated metal-mesh fiber structure.

For example, a mixture of dry and wetted (via bubbling through DI water) $CO_2$ can be used to obtain an RH in the range of 26 to 38%. A 21 wt % PSu (Udel P3500 LCD by Solvay Advanced Polymers) in DMAC with the 0.2 wt. % TBAC can be used as the polymer solution. This polymer solution can be spun from a 30G (ID~0.152 mm) stainless steel needle with a flow rate of 0.05 ml/hr, a gap of 25.4 cm, an applied potential of 29.5 kV DC, and a $CO_2$ gas jacket flow rate of 8 L/min.

The nanofibers produced by the present invention include, but are not limited to, acrylonitrile/butadiene copolymer, cellulose, cellulose acetate, chitosan, collagen, DNA, fibrinogen, fibronectin, nylon, poly(acrylic acid), poly(chloro styrene), poly(dimethyl siloxane), poly(ether imide), poly(ether sulfone), poly(ethyl acrylate), poly(ethyl vinyl acetate), poly(ethyl-co-vinyl acetate), poly(ethylene oxide), poly(ethylene terephthalate), poly(lactic acid-co-glycolic acid), poly(methacrylic acid) salt, poly(methyl methacrylate), poly(methyl styrene), poly(styrene sulfonic acid) salt, poly(styrene sulfonyl fluoride), poly(styrene-co-acrylonitrile), poly(styrene-co-butadiene), poly(styrene-co-divinyl benzene), poly(vinyl acetate), poly(vinyl alcohol), poly(vinyl chloride), poly(vinylidene fluoride), polyacrylamide, polyacrylonitrile, polyamide, polyaniline, polybenzimidazole, polycaprolactone, polycarbonate, poly(dimethylsiloxane-co-polyethyleneoxide), poly(etheretherketone), polyethylene, polyethyleneimine, polyimide, polyisoprene, polylactide, polypropylene, polystyrene, polysulfone, polyurethane, poly(vinylpyrrolidone), poly(2-hydroxy ethyl methacrylate) (PHEMA), gelatin, proteins, SEBS copolymer, silk (natural or synthetically derived), and styrene/isoprene copolymer.

Additionally, polymer blends can also be produced as long as the two or more polymers are soluble in a common solvent or mixed solvent system. A few examples would be: poly(vinylidene fluoride)-blend-poly(methyl methacrylate), polystyrene-blend-poly(vinylmethylether), poly(methyl methacrylate)-blend-poly(ethyleneoxide), poly(hydroxypropyl methacrylate)-blend poly(vinylpyrrolidone), poly(hydroxybutyrate)-blend-poly(ethylene oxide), protein blend-polyethyleneoxide, polylactide-blend-polyvinylpyrrolidone, polystyrene-blend-polyester, polyester-blend-poly(hydroxyethyl methacrylate), poly(ethylene oxide)-blend poly(methyl methacrylate), poly(hydroxystyrene)-blend-poly(ethylene oxide)).

Other embodiments of the present invention include the use of polymers that are pH and/or thermal responsive such that the nanofiber mat can later be modified, respond to a change in environment, or easily dissolved. Example polymers include the commercial pH sensitive polymers know as Eudragit polymers as well as copolymers of N-isopropyl acrylamide (NIPAM) and N-methyacryloy-L-Leucine (MALEU) or (N,N-dimethylamino)ethyl methacrylate (DMAEMA). A similar approach would be to use polymers that are easily degraded with enzymes such as Chitosan which is degraded by Chitosanase and cellulose which is degraded by α-cellulase. Combinations of polymer systems could be used to tune the nanofiber filter mat properties to the particular application The thickness of the nanofiber mat can vary from about 0.25 μm (250 nm) to 500 μm or beyond if needed, where most filters had an average mat thickness in the range of 2 to 5 microns. The average mat thickness numbers represent the average thickness of the total nanofiber mat in a filter. Alternately the mat thickness can be defined as layers of nanofibers with the thickness including from 4 to 4000 layers where 4 to 400, or 5 to 100, or 5 to 15 layers were typical in various embodiments.

Here, in one embodiment of the present invention, the substrate with the deposited nanofibers can be readily removed from the metal mesh. The result is a flexible substrate with the patterned nanofibers that can then be used without the metal mesh and nevertheless yield the desired high FoM and efficiency previously only possible when using direct deposition of nanofibers onto the metal mesh.

Figure 7:
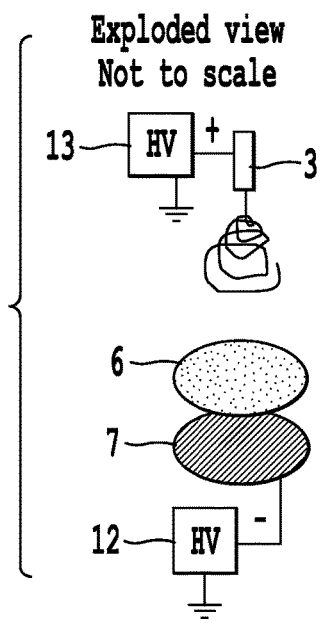
FIG. 7 is a depiction of one process embodiment of the present invention.

FIG. 7 is a depiction of one process embodiment of the present invention. More specifically, FIG. 7 illustrates an exploded view of the fabrication process usable by the present invention. The left hand side of FIG. 7 is an exploded view (Step 1) of the setup to deposit nanofibers onto a flexible substrate (e.g. insulating nonwoven) in a patterned fashion. The right hand side of FIG. 7 is an exploded view of Step 2, where the substrate with the patterned nanofibers is removed from the mesh and removed from the deposition system, thus providing a filter media with superior performance in FoM and efficiency.

Figure 8:
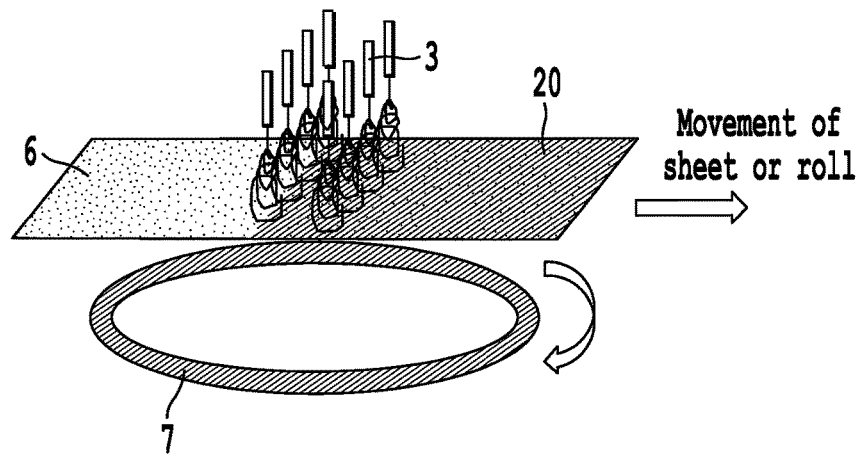
FIG. 8 is a depiction of a scale up concept for patterned deposition according to one embodiment of the present invention.

Accordingly, an important feature of the present invention is that the substrate the nanofibers are deposited onto is static in movement relative to the underlying mesh (or other device) that provides the patterned deposition of the fibers. FIG. 8 is a depiction of a scale up concept for patterned deposition according to one embodiment of the present invention. Accordingly, shown in FIG. 8 is one way of scaling up the patterned fiber formation process of the present invention. Here, a substrate (sheet or part of a roll) moves past a set of spinnerets. Supporting and underneath the substrate is a conveyor belt with a mesh or desired pattern that moves at a matching velocity such that the velocity of the substrate relative to the velocity of the conveyor belt, in the region of fiber deposition, is zero. A regular pattern of nanofibers is deposited upon the substrate.

In this approach, the electric field in the vicinity of where the fibers are being deposited moves at the same speed as the sheet or roll. Another approach is to use a moving electric field synchronized with the moving sheet or roll generated by a structure below the moving sheet, or roll. As shown in FIG. 8, a conveyor belt or mesh (or patterned support) moves with the substrate such that the relative velocity of the substrate to the patterned mesh during fiber deposition is zero. This provides for the establishment of well defined patterns of fibers that provide the needed structure for improved filtration performance. In this configuration, the underlying conveyor belt (with a predefined pattern) contacts the substrate as a roller would. The electric field is impressed on the top surface of the substrate which is directly above the contact point.

Other configurations (for example flat conveyor configurations) with more extensive contact between the underlying conveyor belt (with the predefined pattern) can be used as long as the fiber deposition occurs in a region where there is no relative movement between the underlying patterned support and the substrate.

INDUSTRIAL APPLICATIONS

One immediate use for the invention is to improve the filtration performance of non-conductive or semi-conductive materials by making it possible to apply uniform nanofiber patterns to previous materials that had poor filtration properties. The present invention provides the capability to use flexible nonwoven materials instead of a metal mesh to achieve high collection efficiency at reduced airflow resistance.

Other applications that may be possible are: the ability to create patterns within fabrics or onto materials that are unseen until a certain wavelength of light is incident thereon, the ability to create enhanced filtration incorporated into products such as face masks, protective suits, gloves, hats, etc. Other applications include the potential to deposit nanofibers onto paper products such as writing paper, various paper products, posters, etc. More applications include the ability to put patterns onto leggings, pantyhose, and other skin hugging materials such as spandex. Other applications include the ability to create layers of nanofiber spun materials by the pulling of the nanofibers into the materials by the electric field; or by overlaying them after preparation. Another possibility is to spin fibers onto materials on one side, then flip the material over to spin on the back side. Another concept is to spin different nanofiber pattern layers on the material.

Another possibility is that the electric fields may help conformal deposition of fibers onto contoured surfaces.

With the present invention flexible media with nanofibers can now be pleated, increasing the oil and dust loading capacity.

Although the practice described above was specific to needle-based electrospinning using a polymer and solvent system, other fiber generating systems could be used with this present invention. Specifically, electroblowing can be used here in the present invention. The terms "electroblowing" and "electro-blown spinning" are used in the art to refer interchangeably to a process for forming a fibrous web by which a forwarding gas stream is directed generally towards a collector, into which gas stream a polymer stream is injected from a spinning nozzle, thereby forming a fibrous web which is collected on the collector, wherein a voltage differential is maintained between the spinning nozzle and an electrode and the voltage differential is of sufficient strength to impart charge on the polymer as it issues from the spinning nozzle.

Such techniques are described in U.S. Pat. No. 7,931,456 (the entire contents of which are incorporated herein by reference). Using that technique for example, nanofibers suitable for this invention can be formed by an electroblowing process which issues an electrically charged polymer stream from a spinning nozzle in a spinneret and which passes the polymer stream by an electrode to which a voltage is applied. The spinneret is substantially grounded, such that an electric field is generated between the spinneret and the electrode of sufficient strength to impart electrical charge to the polymer stream as it issues from the spinning nozzle. Finally, with this method, the nanofibers formed from the charged polymer stream could be deposited on a collector holding for example substrates with inter-digitated electrodes. Alternatively, with this method, the nanofibers formed from the charged polymer stream could be deposited on a collector holding for example the substrates without electrodes. In that case, the electrodes would be later added to the deposited fibers to form the sensors of this invention.

Similarly centrifugal spinning could be combined with an electric field to produce charged fibers that would work with this present invention. In fact, any fiber-production process that could produce charged fibers that are subject to the directing of the fiber deposition should work with this invention. The present invention is thus applicable to more than fibers that are nanofibers.

Finally, the novel patterning of fibers described above can additionally incorporate materials for functionality (i.e., smart textiles). Functionalities include the incorporation of materials like phosphorus, conductive particles, reactive particles, etc. Textiles could be made that sense and respond to the localized environment next to a patient's skin and provide patient monitoring. In the fashion world, light stimulated materials could be incorporated in to the fibers and the fibers thereafter patterned onto a textile to create a composite with pleasing visual effects (e.g. attractive pattern that lights up under certain lighting conditions).

Numerous modifications and variations of the present invention are possible in light of the above teachings. It is therefore to be understood that within the scope of the appended claims, the invention may be practiced otherwise than as specifically described herein.

The invention claimed is:

1. A filtration device comprising:
    a base filtration material having openings for fluid flow therethrough; and
    a filtration medium disposed in contact with the base filtration material, said filtration medium comprising a plurality of nanofibers formed on the base filtration material, and
    a collection of said nanofibers having a macroscopically ordered pattern formed by the nanofibers themselves comprising sections of differently oriented fibers, the pattern comprising first and second sections of oriented fibers with the second section having an orientation different from the first section, the pattern present on a surface of the collection of the nanofibers, and the collection comprising a first macroscopic region having said nanofibers at a greater thickness than a second macroscopic region having said nanofibers, wherein the nanofibers in the first macroscopic region and the nanofibers in the second macroscopic region form together the macroscopically ordered pattern,
    wherein the filtration medium has a figure of merit greater than 30 kPa$^{-1}$, where the figure of merit is given by $-\text{Log}(Pt)\Delta P$, where Pt is the fractional penetration of a specific aerosol particle diameter and $\Delta P$ is a pressure drop across the filtration medium corresponding to a face velocity of 5.3 cm/s and particle size of 0.3 microns.

2. The device of claim 1, wherein said base filtration material is a flexible material.

3. The device of claim 1, wherein said base filtration material comprises a woven material or a non-woven material.

4. The device of claim 1, wherein said base filtration material comprises at least one of a filter, a plastic foam, a metallic foam, a semi-conductive foam, a woven material, a nonwoven material, a plastic screen, a textile, and a high efficiency particulate air (HEPA) filter medium.

5. The device of claim 1, wherein the nanofibers comprise nanofibers formed above an electrically biased support having a pre-defined pattern.

6. The device of claim 1, wherein the nanofibers are attached and intermixed with the base filtration material.

7. The device of claim 1, wherein the nanofibers have an average fiber diameter of less than 1000 nm.

8. The device of claim 1, wherein the nanofibers have an average fiber diameter of less than 200 nm.

9. The device of claim 1, wherein the filtration medium comprises plural layers of the nanofibers.

10. The device of claim 9, wherein the plural layers comprise between 4 to 4000 layers of the nanofibers.

11. The device of claim 9, wherein the plural layers comprise between 10 to 100 layers of the nanofibers.

12. The device of claim 9, wherein the plural layers comprise a thickness between 0.25 and 500 µm.

13. The device of claim 1, wherein the nanofibers in the collection comprise regions of oriented fibers which repeat across a lateral width of the filtration medium.

14. The device of claim 1, wherein the nanofibers in the collection comprise different regions of oriented fibers in different directions, and the different regions repeat across a lateral width of the filtration medium.

15. The device of claim 1, wherein the figure of merit greater than 40kPa$^{-1}$.

16. The device of claim 1, wherein the figure of merit greater than 50kPa$^{-1}$.

17. The device of claim 1, wherein the figure of merit greater than 60kPa$^{-1}$.

18. A fiber medium comprising:
a fiber mat structure including,
a base material having openings, and
a plurality of patterned nanofibers forming a filtration medium on the base material, a collection of said nanofibers having a macroscopically ordered pattern formed by the nanofibers themselves comprising sections of differently oriented fibers, the pattern comprising first and second sections of oriented fibers with the second section having an orientation different from the first section, the pattern present on a surface of the collection of the nanofibers, and the collection comprising a first macroscopic region having said nanofibers at a greater thickness than a second macroscopic region having said nanofibers, wherein the nanofibers in the first macroscopic region and the nanofibers in the second macroscopic region form together the macroscopically ordered pattern, wherein the filtration medium has a figure of merit greater than 30 kPa$^{-1}$, where the figure of merit is given by $-\text{Log}(Pt)/\Delta P$, where Pt is the fractional penetration of a specific aerosol particle diameter and $\Delta P$ is a pressure drop across the filtration medium corresponding to a face velocity of 5.3 cm/s and particle size of 0.3 microns,
said fiber mat structure comprising at least one of a filter, a catalytic material source, a battery separator, a wound dressing, a tissue scaffold, a bioactive material source, an antibacterial material source, a textile item, and a sensor.

19. The device of claim 1, wherein the filtration medium is disposed in direct contact with the base filtration material.

20. The medium of claim 18, wherein the filtration medium disposed in contact with the base filtration material.

* * * * *